Patented Oct. 4, 1949

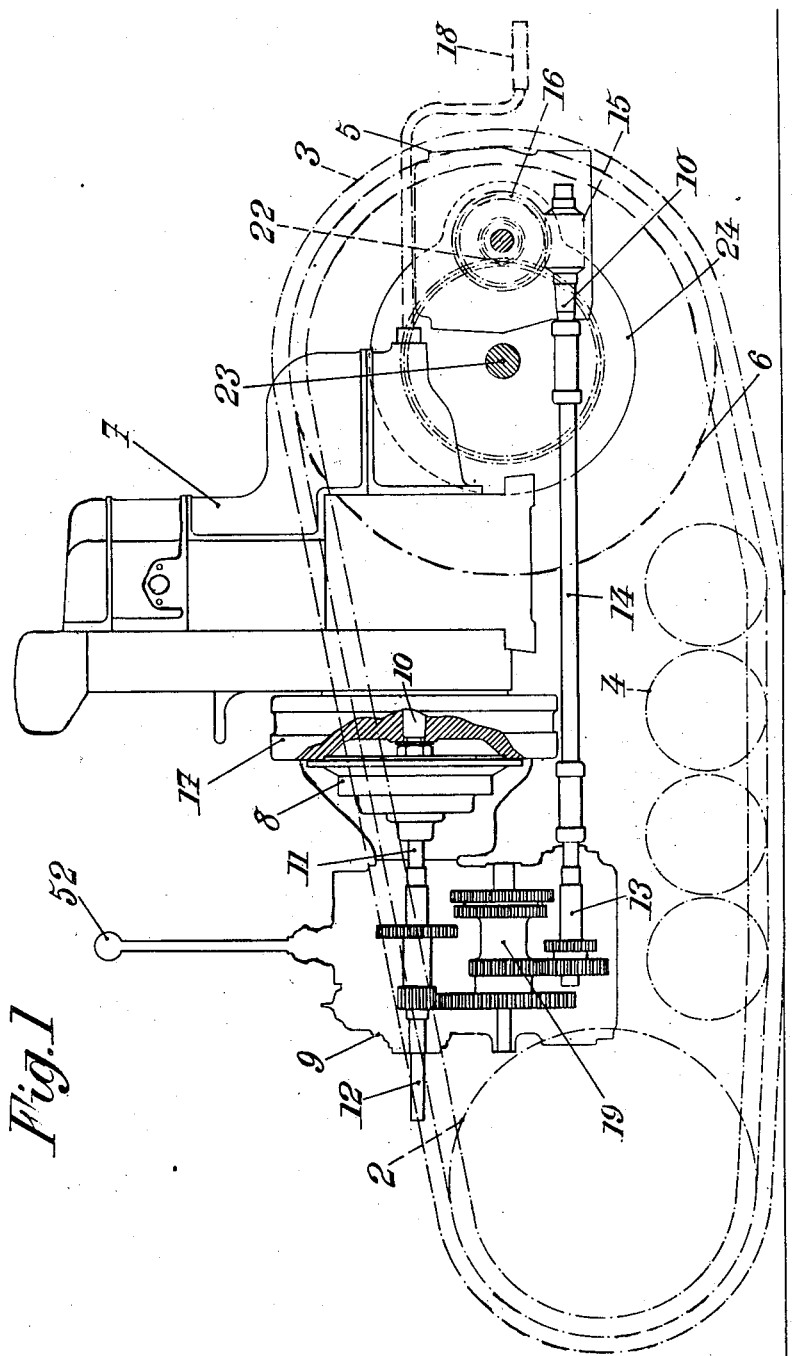

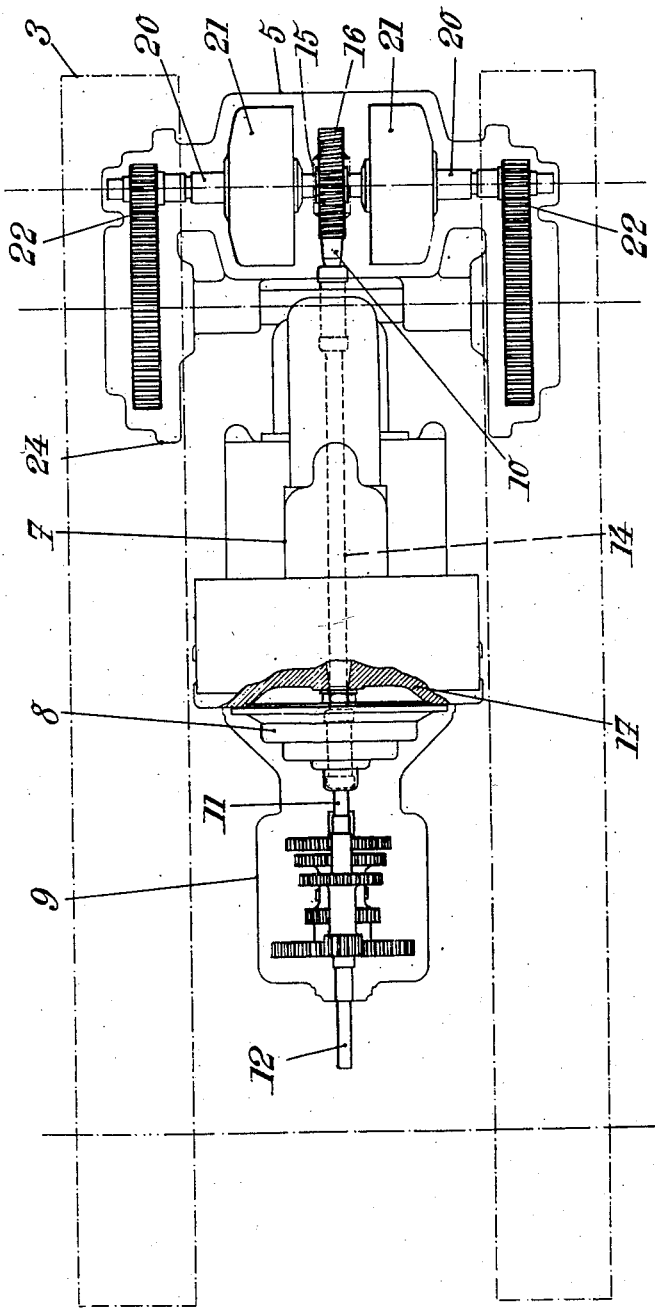

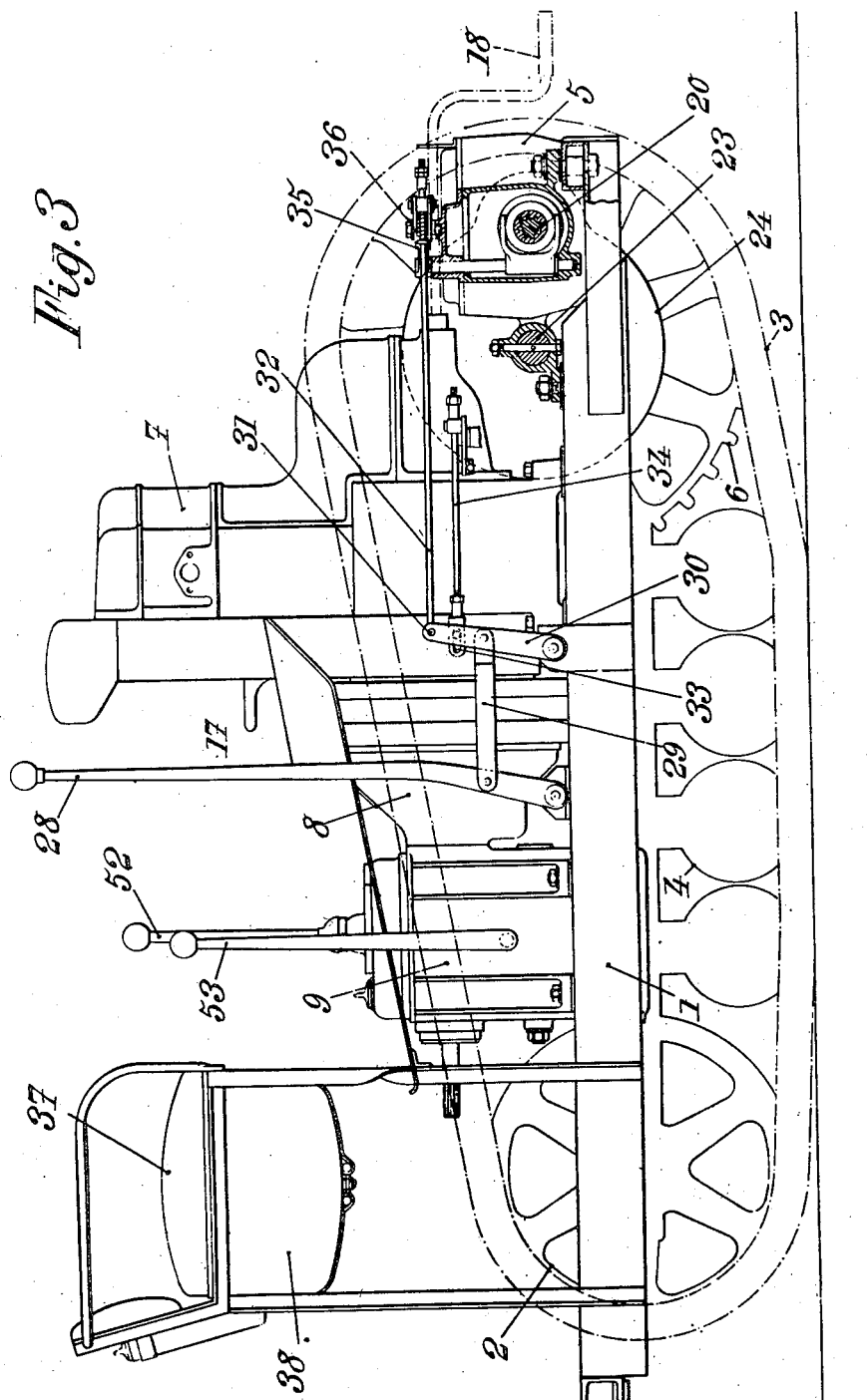

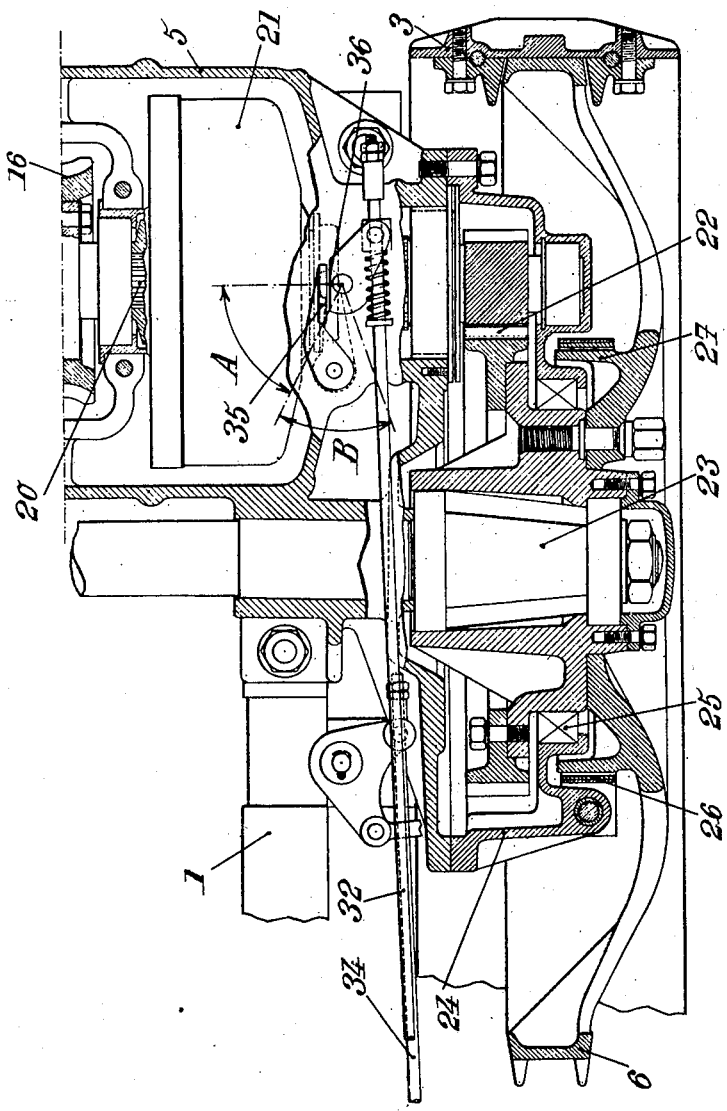

2,483,473

UNITED STATES PATENT OFFICE 2,483,473

ENDLESS TREAD TRACTOR AND DRIVE TRANSMISSION THEREFOR

Gilbert Passelègue, Suresnes, France, assignor to Société Bernard-Moteurs, Rueil-Malmaison, Seine-et-Oise, France, a society of France Application February 22, 1945, Serial No. 579,182
In France December 22, 1941

Section 1, Public Law 690, August 8, 1946
Patent expires December 22, 1961

3 Claims. (Cl. 180—9.1)

My invention relates to tractor vehicles and more particularly agricultural tractors.

Its chief object is to provide an endless track tractor which is better adapted to meet the requirements of practice than those used for the same purpose up to the present time.

A preferred embodiment of my invention will be hereinafter described with reference to the accompanying drawings, given merely by way of example, and in which:

Fig. 1 is a diagrammatical side view of a tractor devised in accordance with my invention, the essential parts only being shown.

Fig. 2 is the corresponding plan view.

Fig. 3 is a side view with parts in section showing a number of associated arrangements not illustrated in Fig. 1.

Fig. 4 is a fragmental horizontal section of the driving axle and associated parts.

Referring to Figs. 1 to 3, the tractor comprises a frame 1 carrying at the rear loose pulleys 2 for the endless track 3 and in its middle the usual supporting rollers 4. Frame 1 also carries at its front part a casing or box 5 which carries the driving sprockets 6 for endless track 3. The engine 7 is fixed on frame 1 just behind casing 5 and it carries rearwardly the main clutch 8 and the gear box 9.

Engine 7 is preferably of the vertical single cylinder type. In casing 5 is journalled an input shaft 10 protruding rearwardly therefrom in longitudinal relation with respect to the tractor.

Gear box 9 comprises an input shaft 11 extending rearwardly at 12 to permit of deriving power from the tractor engine, and an output shaft 13 extending forwardly and connected with the above described shaft 10 by means of an intermediate shaft 14. Shafts 10 and 13 are preferably disposed substantially horizontal and in line with each other. As shown in Fig. 1, the arrangement is such that shaft 14 passes below engine 7 and preferably as low as possible, but however in such a manner that the lowest point of the gearing should be at a minimum distance above ground by matter of safety, such distance being for instance equal to about 25 cm. For this purpose, the driving axle gearing preferably comprises a worm and worm wheel gear 15, 16 wherein the worm 15, carried by shaft 10, is disposed below the worm wheel 16.

Engine 7 with the associated flywheel 17 is fixed on the frame above shaft 14, as aforesaid, and the engine shaft extends forwardly above the driving axle casing 5 to receive the starting handle 18 which is thus located at the front of the tractor.

Owing to the relative positions of shaft 14 and of the engine shaft, shafts 13 and 11 of the gear box, being respectively in line with the aforesaid shafts, are materially distant from each other and in order to avoid gears of large diameter which would require a cumbersome gear box, there is provided an intermediate shaft 19 as shown. The internal construction of the gear box will be described later on.

The driving gear comprises the above described worm gearing 15, 16. Wheel 16 (Fig. 2) drives two co-axial lateral shafts 20 through two corresponding clutches 21. And each shaft 20 drives a sprocket 6 (Figs. 3 and 4) through reduction gears 22 (Figs. 2 and 4), sprockets 6 being loosely carried by a fixed shaft 23 (Figs. 3 and 4) supported by the driving axle casing 5 rearwardly with respect to shafts 20. Gears 22 are preferably housed within casings 24 (Figs. 2, 3 and 4) with tight packings 25 around the hubs of sprockets 6. And there is associated with each sprocket 6 a brake 26 acting on a cylindrical drum 27 in one with said sprocket.

Clutches 21 and brakes 26 are preferably controlled by means of levers 28 (Fig. 3) disposed on each side of the tractor, each lever 28 disengaging the corresponding clutch 21 and thereafter actuating the corresponding brake 26 while clutch 21 is retained at the disengaged position. To this end, lever 28 is connected by a connecting rod 29 with an intermediate lever 30. The latter carries at its free end a pivot 31 to which there is articulated a rod 32 adapted to control clutch 21 as explained below. Lever 30 also carries a pin cooperating with an elongated opening 33 provided at the end of a rod 34 which actuates brake 26, the length of opening 33 being such that rod 34 is not moved until clutch 21 is disengaged. Clutch 21 is controlled by means of a lever 35 (Fig. 4) which is actuated by a cam 36 rotated by rod 32. Cam 36 comprises an angular portion A adapted to push lever 35 to disengage clutch 21 and an angular portion B with constant radius adapted to retain clutch 21 disengaged while brake 26 is actuated by rod 34 as above explained.

The tractor comprises a seat 37 (Fig. 3) for the driver and a fuel tank 38 preferably disposed beneath seat 37. It may also carry a gas producer which is then preferably disposed above casing 5 in front of engine 7. Owing to the arrangement described, the tractor thus established has its center of gravity positioned in its forepart. It is preferable that the center of gravity should be located between the first and second supporting rollers 4 which is of advantage to avoid rising of the forepart of the tractor under the action of high tractive forces.

While I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A tractor which comprises, in combination, a frame, at least two endless tracks movable with respect to said frame, two sprockets for driving said endless tracks, a transverse axle for said sprockets carried by said frame at the front thereof, an engine carried by said frame directly behind said axle, a gear box carried by said frame behind said engine, a clutch interposed between said engine and said gear box, two transverse shafts carried by said frame ahead of said axle and between said sprockets, clutches mounted on said transverse shafts, speed reducing gears interposed between said transverse shafts and said sprockets, a longitudinal transmission shaft extending from the output of said gear box in the frontward direction in the longitudinal middle plane of the tractor, at a level below that of said axle and of said transverse shafts, and a gear transmission between said longitudinal shaft and said transverse shafts.

2. A tractor which comprises, in combination, a frame, at least two endless tracks movable with respect to said frame, two sprockets for driving said endless tracks, a transverse axle for said sprockets carried by said frame at the front thereof, an engine carried by said frame directly behind said axle, a gear box carried by said frame behind said engine, a clutch interposed between said engine and said gear box, two transverse shafts carried by said frame ahead of said axle and between said sprockets, clutches mounted on said transverse shafts, speed reducing gears interposed between said transverse shafts and said sprockets, a longitudinal transmission shaft extending from the output of said gear box in the frontward direction in the longitudinal middle plane of the tractor, at a level below that of said axle and of said transverse shafts, and a worm and wormwheel gear transmission between said longitudinal shaft and said transverse shafts.

3. A tractor which comprises, in combination, a frame, at least two endless tracks movable with respect to said frame, two sprockets for driving said endless tracks, a transverse axle for said sprockets carried by said frame at the front thereof, an engine, having a single vertical cylinder carried by said frame directly behind said axle, a gear box carried by said frame behind said engine, a clutch interposed between said engine and said gear box, two transverse shafts carried by said frame ahead of said axle and between said sprockets, clutches mounted on said transverse shafts, speed reducing gears interposed between said transverse shafts and said sprockets, a longitudinal transmission shaft extending from the output of said gear box in the frontward direction in the longitudinal middle plane of the tractor, at a level below that of said axle and of said transverse shafts, and a worm and worm wheel gear transmission between said longitudinal shaft and said transverse shafts.

GILBERT PASSELÈGUE.

REFERENCES CITED

The following references are of record in the file of this patent:

UNITED STATES PATENTS

| Number | Name | Date |
| --- | --- | --- |
| 1,340,514 | Allen | May 18, 1920 |
| 1,356,615 | Foote | Oct. 26, 1920 |
| 1,443,768 | Stahl | Jan. 30, 1923 |
| 1,559,629 | Leake | Nov. 3, 1925 |
| 1,869,191 | Ferguson et al. | July 26, 1932 |
| 1,945,185 | Eberhard | Jan. 30, 1934 |
| 2,328,804 | Hollmann et al. | Sept. 7, 1943 |
| 2,349,064 | Weaver | May 16, 1944 |

FOREIGN PATENTS

| Number | Country | Date |
| --- | --- | --- |
| 765,860 | France | Mar. 31, 1934 |